(12) United States Patent
Nguyen et al.

(10) Patent No.: US 11,465,522 B2
(45) Date of Patent: Oct. 11, 2022

(54) RENEWABLE RESOURCE AUTONOMOUS CHARGING

(71) Applicant: DISH Network L.L.C., Englewood, CO (US)

(72) Inventors: Vincent Nguyen, Highlands Ranch, CO (US); Umit Shah, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 222 days.

(21) Appl. No.: 16/876,867

(22) Filed: May 18, 2020

(65) Prior Publication Data
US 2021/0354581 A1 Nov. 18, 2021

(51) Int. Cl.
| | |
|---|---|
| *B60L 53/36* | (2019.01) |
| *H04W 4/02* | (2018.01) |
| *B64C 39/02* | (2006.01) |
| *G05D 1/10* | (2006.01) |
| *H02J 7/35* | (2006.01) |
| *H02J 7/02* | (2016.01) |

(52) U.S. Cl.
CPC ............ *B60L 53/36* (2019.02); *B64C 39/024* (2013.01); *G05D 1/101* (2013.01); *H02J 7/35* (2013.01); *H04W 4/023* (2013.01); *B60L 2200/10* (2013.01); *H02J 7/02* (2013.01)

(58) Field of Classification Search
CPC ...... B60L 53/36; B60L 2200/10; B64C 39/02; B64C 39/024; G05D 1/10; G05D 1/101; H02J 7/35; H02J 7/02; H04W 4/023; H04W 4/02
See application file for complete search history.

(56) References Cited

PUBLICATIONS

Chunxia Su et al., "UAV-Assisted Wireless Charging for Energy-Constrained IoT Devices Using Dynamic Matching," IEEE Internet of Things Journal, vol. 7 Issue: 6, May 5, 2021, 3 pages. Retrieved from https://ieeexplore.ieee.org/document/8967197.
Dimitrios Zorbas et al., "Computing optimal drone positions to wirelessly recharge IoT devices," IEEE Conference Publication, May 5, 2021, 3 pages. Retrieved from https://ieeexplore.ieee.org/document/8406897.

*Primary Examiner* — Robert L Deberadinis
(74) *Attorney, Agent, or Firm* — Kilpatrick Townsend & Stockton, LLP

(57) ABSTRACT

Various arrangements for recharging an energy source are provided herein. In response to a device having a state of charge below a first threshold, a mobile device, such as an unmanned aerial vehicle (UAV) can be provided location information for the device. The mobile device may travel to within a certain proximity from the device. The mobile device may then a connection with the device. A charging sequence may then be initiated to recharge the energy source of the device.

20 Claims, 5 Drawing Sheets

RENEWABLE RESOURCE AUTONOMOUS CHARGING

BACKGROUND

Within Internet of Things (IoT) based systems, many devices constantly communicate with each other. One or more devices, within the IoT-based system, may rely upon an extinguishable energy source to power itself. When the extinguishable energy source goes below a particular threshold, the particular device relying on that energy source may no longer be able to communicate with other devices. Thus, there is a need to provide a solution that provides charging mechanism to devices within an IoT-based system.

SUMMARY

Various embodiments are described related to a method for recharging an energy source. In some embodiments, a method for recharging an energy source is described. The method may comprise, in response to a first device having a state of charge below a first threshold, receiving, at a mobile device, from a backend computer system, location information for the first device. The method may comprise positioning, by the mobile device, a certain proximity from the first device. The method may comprise establishing, by the mobile device, a connection between the mobile device and the first device. The method may comprise initiating, via a first connection, a charging sequence to recharge the energy source associated with the first device.

Embodiments of such a system may include one or more of the following features: the mobile device may be an unmanned aerial vehicle (UAV). The connection between the mobile device and the first device may be a wired or wireless charging connection. The method may comprise, during the charging sequence, receiving, by a renewable energy device of the mobile device, one or more renewable energy sources. The method may comprise, during the charging sequence, converting, by the renewable energy device of the mobile device, the one or more renewable energy sources into energy. The method may comprise, during the charging sequence, recharging, via the energy, the energy source associated with the first device. The method may further comprise during the charging sequence, discharging a battery of the mobile device to recharge the energy source associated with the first device. The method may further comprise subsequent to the charging sequence, receiving, by the mobile device, a harvesting location associated with a renewable energy device of the mobile device. The method may further comprise positioning, by the mobile device, at a location within the harvesting location. The method may further comprise recharging, via the renewable energy device of the mobile device, an energy source associated with the mobile device at the location within the harvesting location. The method may further comprise, subsequent to recharging the energy source associated with the mobile device, receiving, from the backend computer system, a second location associated with a second device. The first device and the second device may be part of a same network.

In some embodiments, a system for recharging an energy source is described. The system may comprise a first device that has the energy source that may be rechargeable. The system may comprise a backend computer system that may determine when a first device has a state of charge that may be below a defined threshold. The system may comprise a mobile device capable of travelling to the first device. The mobile device may be configured to receive, from the backend computer system, location information for the first device. The device may be configured to position a certain proximity from the first device. The device may be configured to establish a connection between the mobile device and the first device. The device may be configured to initiate a charging sequence to recharge the energy source associated with the first device.

Embodiments of such a system may include one or more of the following features: the mobile device may be an unmanned aerial vehicle (UAV) that may comprise an aerial propulsion system. The UAV may comprise a wired connection that may be established with the first device. The UAV may comprise a wireless charging connection that may be used to charge the energy source. The UAV may comprise a renewable energy device that, during the charging sequence, may be configured to receive a renewable energy source. The device may be configured to convert the renewable energy source into energy. The device may be configured to recharge, using the energy, the energy source associated with the first device. The UAV may comprise a battery and the UAV may be configured to discharge the battery to recharge the energy source associated with the first device. The UAV may be further configured to, subsequent to the charging sequence, receive from the backend computer system, an indication of a harvesting location associated with a renewable energy device of the mobile device. The UAV may be further configured to position at a location within the harvesting location. The UAV may be further configured to recharge, via a renewable energy device of the UAV, an energy source at the location within the harvesting location. The UAV may be further configured to subsequent to recharging the energy source, receive, from the backend computer system, a second location associated with a second device. The first device and the second device may be part of a same network.

In some embodiments, a non-transitory processor-readable medium for using an unmanned aerial vehicle (UAV) to recharge an energy source is described. The medium may comprise processor-readable instructions configured to cause one or more processors to receive, from a backend computer system, location information for a first device that requires energy. The medium may comprise processor-readable instructions configured to cause one or more processors to cause the UAV to position a certain proximity from the first device. The medium may comprise processor-readable instructions configured to establish a connection between the UAV and the first device. The medium may comprise processor-readable instructions configured to initiate a charging sequence to recharge the energy source associated with the first device.

Embodiments of such a system may include one or more of the following features: the processor-readable instructions may be further configured to cause the one or more processors to, during the charging sequence, cause the UAV to receive a renewable energy source. The processor-readable instructions may be further configured to cause the one or more processors to, during the charging sequence, control conversion of the renewable energy source into energy. The processor-readable instructions may be further configured to cause the one or more processors to, during the charging sequence, cause recharging, using the energy, of the energy source associated with the first device. The processor-readable instructions may be further configured to cause the one or more processors to, subsequent to the charging sequence, receive, from the backend computer system, an indication of a harvesting location associated with a renewable energy device of the UAV. The processor-readable instructions may be further configured to cause the one or more processors to, subsequent to the charging sequence, cause the UAV to position at a location within the harvesting location. The processor-readable instructions may be further configured to cause the one or more processors to, subsequent to the charging sequence, cause the UAV to recharge, via a renewable energy device of the UAV, an energy source at the location within the harvesting location. The processor-readable instructions are further configured to cause the one or more processors to, subsequent to recharging the energy source at the location within the harvesting location, receive, from the backend computer system, a second location associated with a second device. The first device and the second device may be part of a same network. The processor-readable instructions may be further configured to cause the one or more processors to activate a wireless charging connection that may be used to charge the energy source of the first device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
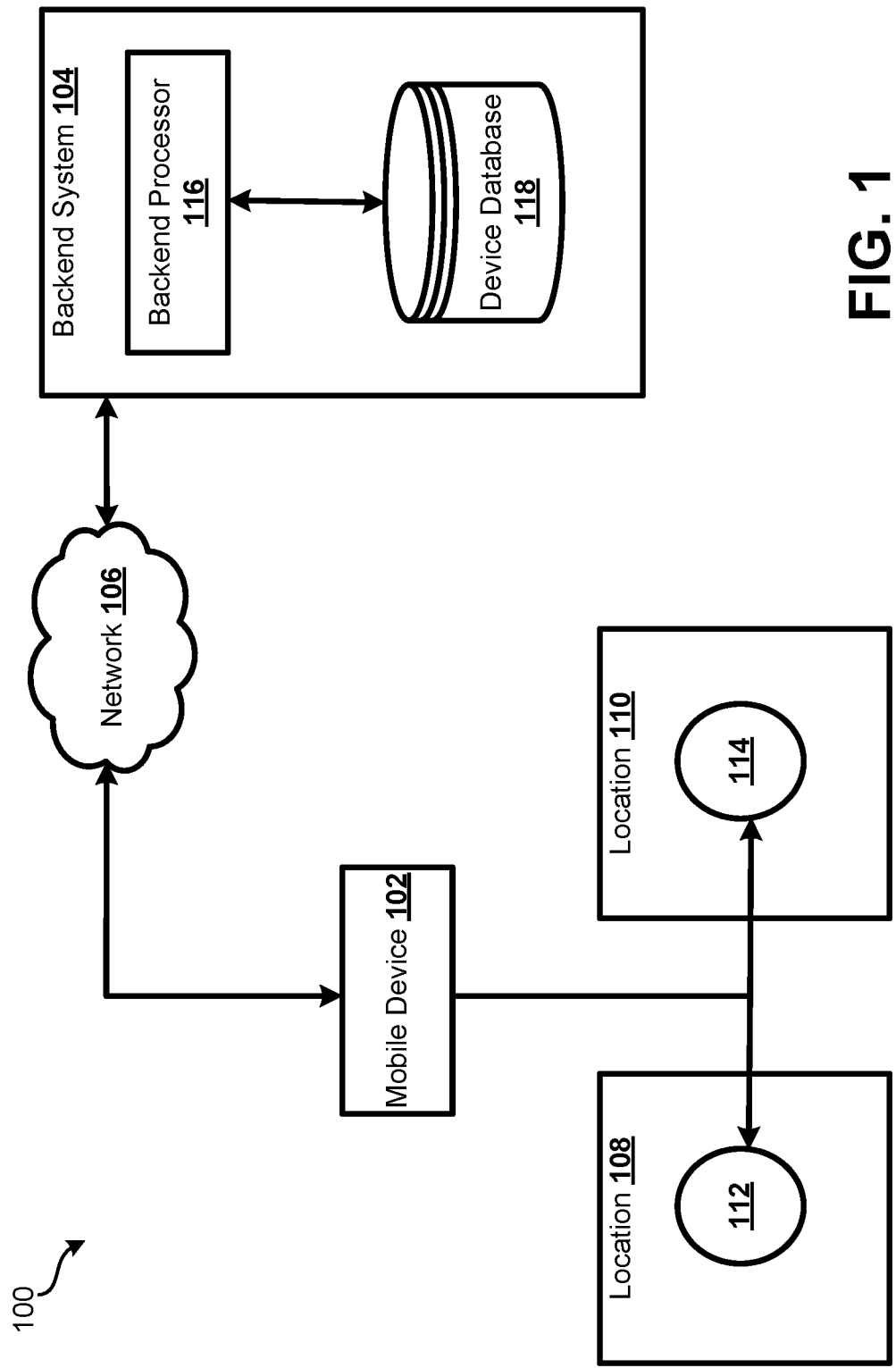
FIG. 1 illustrates an example of a computer network in accordance with one or more embodiments described herein.

Embodiments described herein generally relate to renewable resource autonomous charging of one or more devices. More specifically, embodiments described herein disclose techniques for an unmanned aerial vehicle (UAV) (or other autonomous vehicle such as a self-driving car) to be an interface between a renewable energy source and a device. A backend system may receive a charge indicator that indicates a state of charge of an energy source associated with a device. The energy source associated with the device may be a rechargeable energy source that powers one or more devices. For example, in a particular network, such as a Narrow Band Internet of Things (NBIoT) network, devices may have their own energy source or devices may share energy sources. The backend system may determine, based on the received charge indicator, that the power source associated with the device is below a particular threshold and should be recharged. In response to such a determination, the backend system may transmit to a UAV coordinates associated with the device.

The UAV may be equipped with a renewable energy device that is capable of charging an energy source based on one or more renewable energy sources. For example, the renewable energy device may be a solar panel, a wind turbine, hydroelectric turbine, point absorbers, geothermal heat pump system, magnetic coupling (transformer, coil, air coil, power lines), vibration (piezo-electric), electromagnetic energy harvester, and the like. The renewable energy device may convert one or more renewable sources into energy to recharge an energy source such as Nickel Cadmium (NiCd) batteries, Nickel-Metal Hydride (NiMH) batteries, Lithium Ion (Li-ion) batteries, sealed lead acid (SLA) batteries capacitors, super capacitors, and the like. The renewable energy device may recharge one or more energy sources simultaneously.

In one embodiment, the renewable energy device may charge an internal energy source of the UAV. For example, the UAV may comprise a solar panel that receives rays from the sun and charges an internal energy source of the UAV. In such an example, the UAV may establish a wired or wireless connection with a device and recharge an energy source of the device by discharging the UAV's internal energy source. The internal energy source of the UAV may be recharged prior to the UAV being deployed to the device's location, during deployment to the device's location, or once the UAV arrives at the device's location. For example, the UAV may be deployed with a first state of charge associated with an internal energy source (e.g., 45%) and may not establish a connection with the device until a second charge state associated with the internal energy source is reached (e.g., 90%).

The renewable energy device may simultaneously charge an internal energy source of the UAV and an energy source associated with a device. The UAV may arrive at a location associated with the device and land (or dock) at the location. Once landed, the UAV may, via the renewable energy device, charge both its internal energy source and an energy source associated with the device.

In situations where a state of charge of the UAV is below a particular threshold, the backend system may transmit, to the UAV, a location of one or more renewable resources. For example, the backend system may receive, via a broadband cellular connection (e.g., narrow-band Internet of Things, Bluetooth mesh, LoRa, and the like), an indication from the UAV that a state of charge associated with the UAV is 35%, which may be below the threshold of 50%. In response to receiving the state of charge, the backend system may determine one or more types of renewable resources within a proximity of the UAV's flight path to one or more devices. The type of renewable resource may be dependent upon a type of renewable energy device attached to or integrated with the UAV. For example, if the renewable energy device of the UAV is a hydroelectric turbine (or other hydroelectric device), then the backend system may transmit, to the UAV, a location of a suitable body of water (e.g., a stream, a river, a creek, and the like). Once the UAV has been recharged to a particular state of charge (e.g., 85%), the UAV may continue to a location associated with the device and recharge an energy source associated with the device. Recharging an energy resource of a UAV in-route to a device's location may allow the UAV to service several devices without having to return to a particular docking location to recharge. Instead, the UAV may travel to one or more locations of a renewable resource in order to be recharged.

Techniques described herein are an improvement to recharging energy sources associated with devices within a network. Many times, devices within a network, such as an NBIoT network may be in locations that are hard to reach by a human. For example, a weather sensor within an NBIoT network may be located under a bridge or atop of a bridge. In such an example, if a state of charge associated with the weather sensor is low, it may be impractical for a human to manually recharge or replace an energy source associated with the weather sensor. Techniques described herein implement processes and systems for deploying a UAV with a renewable energy device to a location associated with the weather sensor. The UAV may then recharge the energy source associated with the weather sensor by discharging the UAV's own energy source or by utilizing the renewable energy device. In additional embodiments, the UAV may be utilized to physically replace an energy source associated with a device or perform some other type of maintenance associated with the device. In one embodiment, the UAV may be temporarily or permanently used as an energy source for a device. In one embodiment, the UAV may be utilized to physically exchange the device's primary power supply or replace the device itself.

FIG. 1 illustrates an embodiment of a computer network 100 according to one or more embodiments. Computer network 100 comprises mobile device 102, backend system 104, network 106, and locations 108-110. Mobile device 102 may be an unmanned aerial vehicle (UAV), such as a drone. Mobile device 102 may comprise one or more propellers (e.g., standard propellers, pusher propellers, and the like), one or more motors (e.g., brushless motor, brushed motor, and the like), landing gear, one or more electronic speed controllers (ESC), a flight controller, one or more renewable energy devices, one or more energy source interfaces, one or more transceivers, a GPS module, one or more batteries (or other energy sources), and/or one or more cameras. Mobile device 102 may be a fully autonomous UAV such that the UAV may autonomously fly to a particular location based on location information such as GPS coordinates. In one embodiment, mobile device 102 may be an autonomous vehicle such as a self-driving car.

Mobile device 102 may communicate with backend system 104 via network 106. Network 106 may be a 4G, 5G, other broadband cellular networks, or narrow band networks. In one embodiment, backend system 104 may transmit, via network 106, data to mobile device 102 that causes mobile device 102 to perform one or more functions described herein. For example, backend system 104 may transmit, via network 106, one or more GPS coordinates for one or more of devices 112-114 or one or more GPS coordinates for one or more renewable resources. As another example, backend system 104 may transmit, via network 106, one or more maintenance instructions to mobile device 102.

Backend system 104 comprises backend processor 116 and device database 118. Backend system 104 may provide data packets to mobile device 102 and, in some embodiments, determine locations associated with one or more of devices 112-114. Backend processor 116 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Device database 118 may comprise one or more non-transitory processor-readable mediums, such as random access memory (RAM), flash memory, a hard drive disk (HDD), or a solid state drive (SSD). Device database 118 may store data associated with one or more of devices 112-114. For example, device database 118 may store a current location indicator associated with one or more devices, renewable resource locations associated with one or more renewable resources, state of charge thresholds associated with mobile device 102 and/or devices 112-114, and the like.

Locations 108-110 may be geographic locations where one or more of devices 112-114 are physically located. Locations 108-110 may be locations associated with a particular type of network such as a sensor-based network. As depicted, location 108 comprises device 112 and location 110 comprises device 114. Each of devices 112-114 may be connected to each other via a network such as a Low Power Wide Area Network (LPWAN), a Low Power Wireless Personal Area Network (LPPAN), Long Term Evolution (LTE) Cat NB1 Network, LTE Cat NB2 Network, and the like. Devices 112-114 may be sensors (e.g., gas, water, pollution, noise, weather sensors), controllers (e.g., light and heat controller), security monitors (e.g., device capable of tracking a person, animal or asset), audio devices (e.g., loudspeakers and microphones), and the like.

Figure 2:
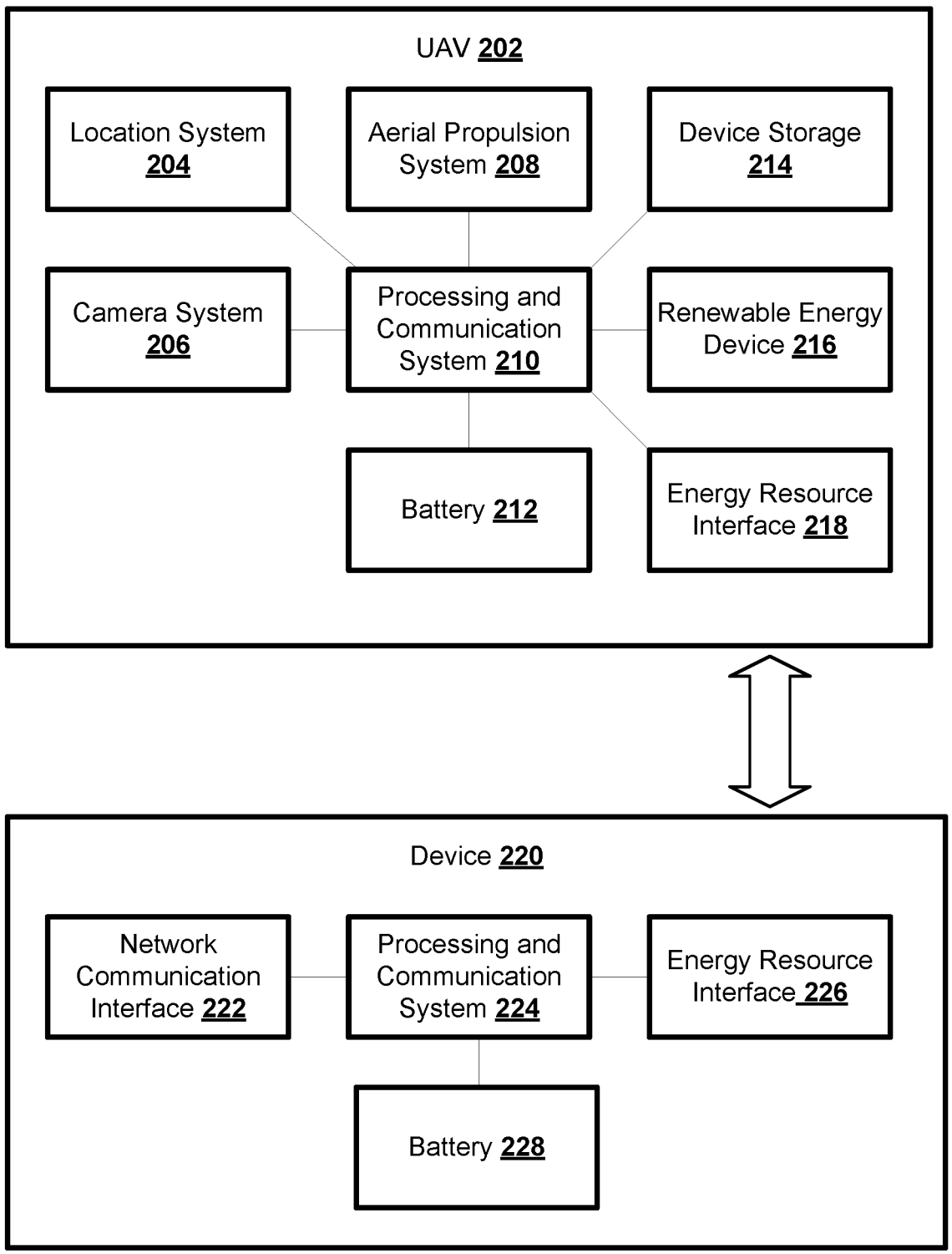
FIG. 2 illustrates an example of a UAV and a device in accordance with one or more embodiments described herein.

FIG. 2 illustrates an embodiment of block diagrams for UAV 202 and device 220. UAV 202 comprises location system 204, camera system 206, aerial propulsion system 208, processing and communication system 210, battery 212, device storage 214, renewable energy device 216, and energy resource interface 218. UAV 202 may represent mobile device 102 as depicted in FIG. 1. Location system 204 may include a GPS system that may communicate with one or more satellites (or other networks) to provide location information associated with UAV 202. Location information may be utilized by UAV to determine proximity to device 220. For example, UAV 202 may need to be within a certain physical range of device 220 in order to recharge battery 228 of device 220 and/or implement one or more short-range communication protocols such as WiFi. Location system 204 may be utilized to locate one or more renewable resource locations. For example, location system 204 may be utilized to find a renewable resource location within a particular proximity (e.g., 5 miles) from a flight path of UAV 20 to device 220. Such a renewable resource location may be the location of a body of water, a location of a suitable location for capturing one or more sun rays, and the like.

Camera system 206 may include one or more cameras. For example, camera system 206 may include digital single-lens reflex camera (DSLR), an infrared camera, a depth camera, and the like. These various camera types may be utilized to capture information about device 220. For example, a DSLR camera may be used to take a picture of a solar panel associated with device 220 to determine, via image recognition, any potential damage to the solar panel. In another example, an infrared camera may be utilized to determine if battery 228 has overheated and cannot maintain a charge.

Aerial propulsion system 208 may include devices that aid UAV 202 in flight. Aerial propulsion system 208 may include propellers (e.g., standard propellers, pusher propellers, and the like), one or more motors (e.g., brushless motor, brushed motor, and the like), landing gear/docking mechanism, one or more electronic speed controllers (ESC), a flight controller, one or more transceivers, and the like.

Processing and communication system 210 may include one or more processors and one or more communication interfaces. The one or more processors may perform, via executing code stored in memory, one or more functions described herein. The one or more communication interfaces may be utilized to communicate (or recharge) via a wired or wireless connection to device 220. The one or more communication interfaces may also be utilized to communicate via a broadband cellular network with a backend system to receive data associated with device 220, such as a location information associated with one or more renewable resources.

Battery 212 may provide power to one or more components of UAV 202. For example, battery 212 may provide power to one or more components of aerial propulsion system 208 in order to propel UAV 202. Battery 212 may be a rechargeable battery, non-rechargeable battery, a capacitor, a super capacitor, or other energy source. Battery 212 may be discharged to recharge battery 228 of device 220. In one embodiment battery 212 may be recharged via renewable energy device 216.

Device storage 214 may store data associated with device 220. Device storage 214 may store data that has been previously received by UAV 202. Data associated with device 220 may include, location information associated with device 220, a state of charge associated with device 220, a desired stated of charge associated with device 220, battery information associated with device 220, wireless charging capabilities associated with device 220 (i.e., if device 220 supports wireless charging), wired charging capabilities associated with device 220 (i.e., what type of charging interfaces device 220 supports), and the like.

Renewable energy device 216 may be a device capable of transforming one or more renewable resources into energy to charge battery 212 and/or battery 228. For example, the renewable energy device may be a solar panel, a wind turbine, hydroelectric turbine, point absorbers, geothermal heat pump system, and the like. In one embodiment, renewable energy device 216 may be concealed within UAV 202 until battery 212 and/or battery 228 is to be recharged. For example, renewable energy device 216 may be a portable wind turbine that is concealed within UAV 202 until battery 212 and/or battery 228 is to be charged. Such a concealment may improve the aerodynamics of UAV 202.

Energy resource interface 218 may be an interface for distributing energy to device 220. Energy resource interface 218 may be a NEMA connector, Universal Serial Bus (USB) connector, coaxial power connector, tip connector, wireless power transfer mechanisms (e.g., Qi wireless charging), and the like.

Device 220 comprises network communication interface 222, processing and communication system 224, energy resource interface 226 and battery 228. Network communication interface 222 may be a system-on-a-chip (SoC) or other hardware device that enables communication between one or more devices. Network communication interface 222 may enable device 220 to communicate with one or more devices within the same network according to a first protocol. For example, network communication interface 222 may allow device 220 to communicate with other devices over a broadband cellular network, satellite network, LPWAN or LPPAN.

Processing and communication system 224 may include one or more processors and one or more communication interfaces. The one or more processors may perform, via executing code stored in memory, one or more functions described herein. The one or more communication interfaces may be utilized to communicate via a wired or wireless connection to UAV 202 via one or more protocols such as, but not limited to, Bluetooth, WiFi, Near Field Communication (NFC), and the like. The one or more communication interfaces may also be utilized to communicate via a broadband cellular network with other devices in a network (e.g., other sensors in a sensor network) to receive and transmit data associated with device 220, such as a IoT data.

Energy resource interface 226 may be an interface for distributing energy to device 220. Energy resource interface 226 may be a NEMA connector, Universal Serial Bus (USB) connector, coaxial power connector, tip connector, and the like. In one embodiment, energy resource interface 226 may comprise of only one type of connection. For example, energy resource interface 226 may be a USB connector. In such an embodiment, different devices within a network may be compatible with only certain energy resource interfaces.

Battery 228 may provide power to one or more components of device 220. For example, battery 228 may provide power to processing and communication system 224 in order to communicate with other devices within a network. Battery 228 may be rechargeable battery, non-rechargeable battery, a capacitor, a super capacitor, or other energy source.

Figure 3:
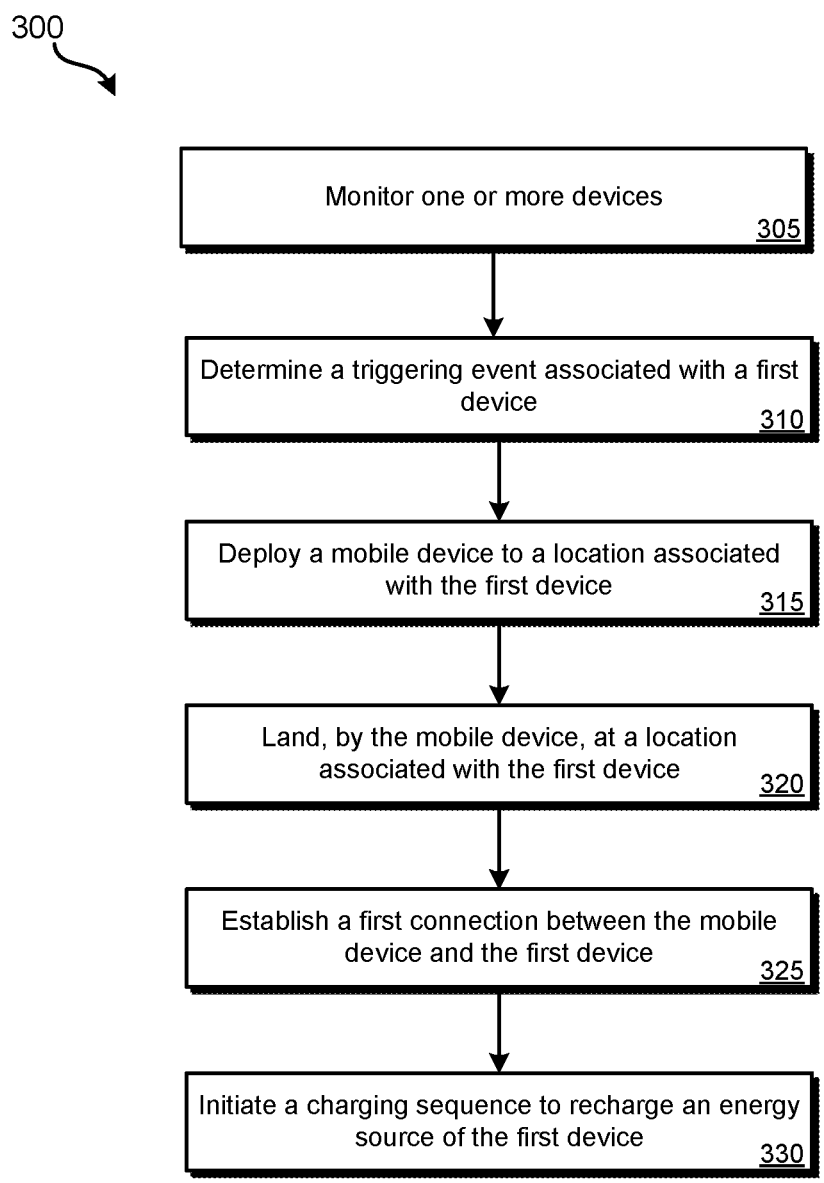
FIG. 3 depicts a first method in accordance with one or more embodiments described herein.

FIG. 3 illustrates an example process 300 in accordance with one or more embodiments described herein. Process 300 may be performed by one or more components of computer network 100. For example, one or more operations of process 300 may be performed by backend system 104 and/or mobile device 102 of FIG. 1. Process 300 may be a process for determining when to initiate a recharge sequence associated with a particular device.

At block 305, a backend system monitors one or more devices. The one or more devices may be a part of one or more networks. For example, the one or more devices may be a plurality of sensors that are part of an NBIoT network. In another example, the one or more devices may be one or more sensors connected to a same satellite network. In one embodiment, the one or more devices may communicate with the backend system via a cellular broadband communication system such as 3G, 4G, and/or 5G. In one embodiment, the backend system receives periodic updates associated with the one or more devices. The periodic updates may include a state of charge associated with a device. The state of charge may indicate the remaining capacity of an energy source associated with a device. For example, the state of charge may indicate the remaining charge of a battery within (or associated with) a device. In one embodiment, the periodic updates may be sent at regular intervals. For example, a regular interval may be every 8 hours, 16 hours, or 24 hours. In addition to the state of charge information, a periodic update may also include weather conditions associated with a device. The weather conditions may indicate if there is, for example, heavy rainfall, overcast conditions, strong winds, and the like. Such information may be useful to the backend system to determine if a mobile device may be capable of being deployed to a device's location and/or what type of renewable energy device may be utilized by the mobile device. For example, if a periodic update indicates overcast conditions, then a mobile device may utilize a hydroelectric-based renewable energy device as opposed to a solar renewable energy device, because a solar renewable energy device would be not be as effective without direct sunlight. The periodic update may also include diagnostic information associated with a device. Diagnostic information may be the result of a self-diagnosis test run by the device. Diagnostic information may indicate an uplink and downlink bandwidth associated with the device, storage capacity (i.e., memory capacity) associated with the device, a current firmware or software version running on the device, and the like.

At block 310, the backend system determines a triggering event has occurred associated with a first device. The first device is one of the one or more devices that are being monitored. The triggering event may indicate one or more items of attention associated with the first device. The triggering event may be a battery capacity associated with the first device falling below a certain threshold (e.g., 10%, 15%, 20% and the like). When the first device falls below the threshold it may indicate that the first device has a certain period of time (e.g., 1 day, 2 days, 2 hours, 8 hours, and the like) before the first device will power down due to lack of power. Such a power down may cause negative effects within a network. For example, the first device may be a weather sensor on a bridge that transmits weather conditions to a traffic controller. In such an example, if the first device malfunctions or powers down, the traffic controller may not properly control one or more traffic lights based upon the current weather conditions. A triggering event may be that a software or firmware version of the first device is outdated. In one embodiment, a triggering event may a battery discharge time period outside of an expected battery discharge time period. For example, the battery for the first device, over the last 10 recharge cycles has discharged on average after 150 days. However, after the most current recharge, the battery for the first device has discharged after 90 days. Such a dramatic increase in the discharge rate of the battery may indicate the battery is degrading and may need to be replaced. In one embodiment, an increase in the discharge rate may indicate that the operations of the first device have dramatically increased and the load placed upon the first device may need to be reduced, for example, by updating the software associated with the first device.

At block 315, the backend system deploys a mobile device to a location associated with the first device. The mobile device may be an unmanned autonomous vehicle or other type of autonomous vehicle. The backend system may have stored, within a device database, GPS coordinates associated with the first device. The backend system may deploy the mobile device by transmitting to the mobile device such GPS coordinates. In one embodiment, the backend system may also transmit to the mobile device, first device information, such as one or more protocols that may be utilized to communicate with the first device (e.g., Bluetooth, Wi-Fi, NFC, and the like), one or more energy resource interfaces (e.g., USB) compatible with the first device, the current state of charge of the first device, one or more renewable resource locations in route to the first device, and the like. In one embodiment, the mobile device may be stationed at the backend system and deployed from the backend system. In one embodiment, the mobile device may be station at a renewable resource location (e.g., a body of water, a wind farm, and the like), at another device (e.g., device of same or different network), or at another location. Regardless of where the mobile device is stationed, the backend system may communicate with the mobile device via a cellular broadband connection.

At block 320, the mobile device lands at a location associated with the first device. The mobile device may land at a designed docking area near the first device or the mobile device may simply land within proximity of the first device. The proximity may be such that a wireless or wired charging connection may be established between the mobile device and the first device. In one embodiment, the mobile device may hover within a certain proximity of the first device. Such an embodiment may be useful where there is no landing area within a proximity of the first device. For example, the first device may be under a bridge and there is no spot for the mobile device to land. In such an example, the mobile device may hover by the first device in order to attempt to establish a wired or wireless charging connection.

At block 325, the mobile device establishes a connection between the mobile device and the first device. The connection may be a wired or wireless charging connection that is compatible with the first device. For example, the connection may be a USB connection, a connection based on the Qi wireless charging standard, Alliance for wireless power charging (A4WP), wireless charging standard, Power Matters Alliance (PMA) wireless charging standard, and the like. In one embodiment, the first device may be compatible with different connections. In such an embodiment, the connection may be selected by the mobile device that achieves the fastest charging. For example, if the mobile device is capable of establishing a USB connection and a Qi wireless charging connection, the mobile device may select the USB connection because it is faster.

At block 330, the mobile device initiates a charging sequence to recharge an energy source of the first device. The energy source of the first device may be an internal or external battery of the first device. The charging sequence may utilize the connection established between the mobile device and the first device as described at block 325. In one embodiment, the charging sequence may comprise discharging an energy source associated with the mobile device in order to charge the energy source of the first device. In such an embodiment, the energy source associated with the mobile device may have been previously charged via a renewable resource, such as wind or water. In another embodiment, the charging sequence may comprise charging simultaneously the energy source associated with the first device and the energy source associated with the mobile device, via a renewable energy device. For example, a solar panel attached to or integrated into the mobile device may receive direct sunlight and covert that sunlight into energy to simultaneously charge both energy sources. As a result of process 300, one or more devices may be charged by a mobile device based upon a renewable energy source.

Figure 4:
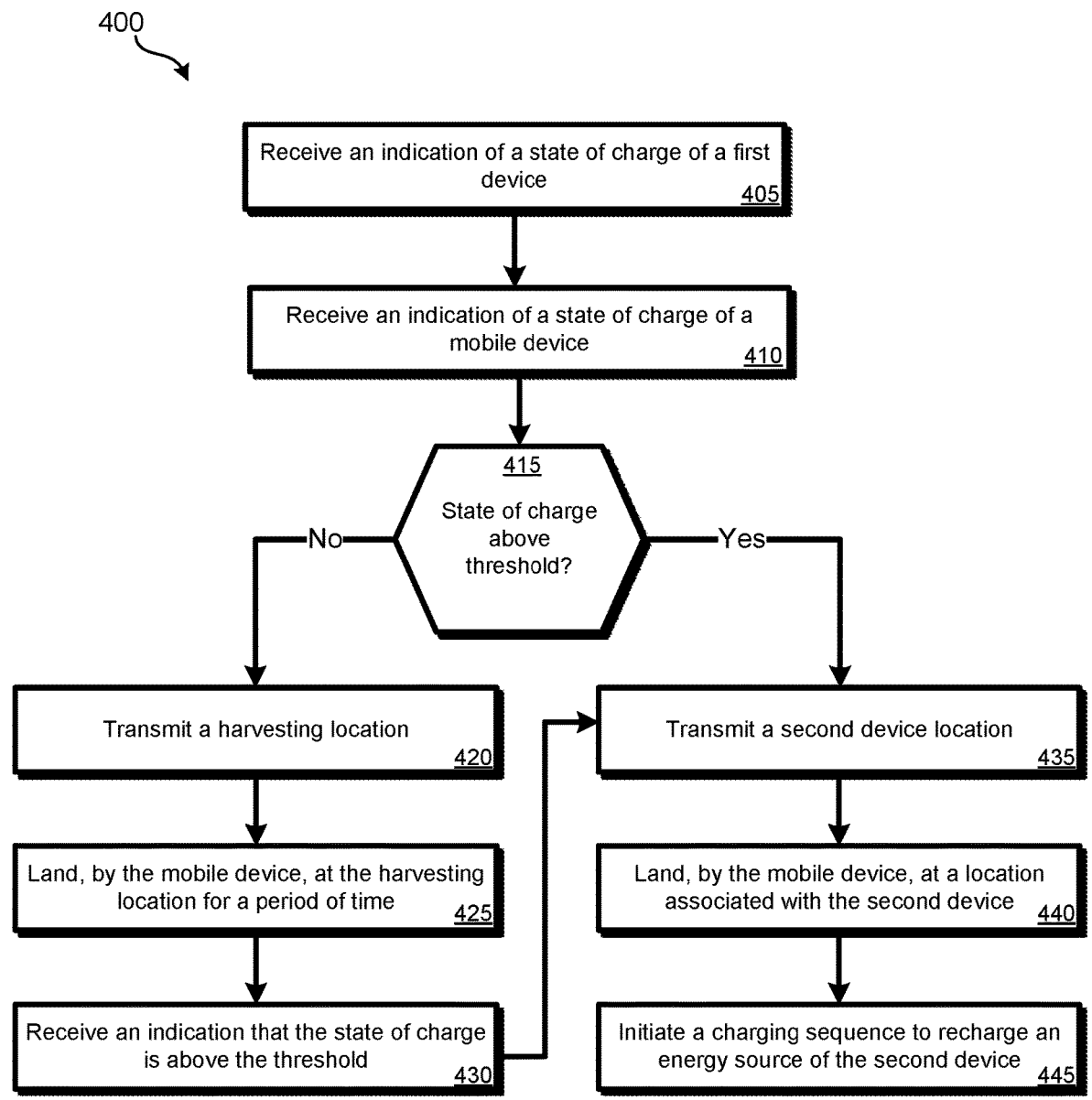
FIG. 4 depicts a second method in accordance with one or more embodiments described herein.

FIG. 4 illustrates an embodiment of process 400. Process 400 may be performed by one or more components of computer network 100. For example, one or more operations of process 400 may be performed by mobile device 102 and/or backend system 104 of FIG. 1. Process 400 may be a process for determining one or more actions of a mobile device after the mobile device has successfully recharged a prior device. For example, process 400 may occur after one or more operations of process 300.

At block 405, a backend system receives an indication of a charge state of a first device. A mobile device may be utilized to recharge an energy source of the first device. During or after a recharge process, the backend system receives an indication of a state of charge of the first device. If the state of charge exceeds a particular threshold (e.g., 85%, 90%, and the like) then the first device may be "fully charged" and no further recharging of the energy source is needed. However, if the state of charge does not exceed a particular threshold then the first device may not be "fully charged" and the mobile device may continue with or start a new recharging process until the first device is "fully charged". The backend system may receive an indication either from the mobile device or the first device regarding the state of charge of the first device and determine when a particular threshold has been exceeded. Once the particular threshold has been exceeded, process 400 moves to block 405.

At block 410, the backend system receives an indication of a state of charge of the mobile device. During the recharge process of the first device, the state of charge associated with an energy resource of the mobile device may be depleted. In one embodiment, the mobile device may transmit to the backend system an indication of the mobile device's state of charge. In one embodiment, the mobile device may transmit periodic state of charge information to the backend system. In one embodiment, the mobile device may transmit state of charge information, after "fully charging" a first device.

At block 415, the backend system determines if the state of charge received from the mobile device is above a certain threshold. For example, such a threshold may be 85%, 90%, and the like. A state of charge above the threshold may indicate that the energy resource associated with the mobile device is sufficient to travel to another location and/or perform another recharge. For example, during a previous recharge process, a renewable energy device associated with the mobile device may simultaneously recharge an energy source of the mobile device. In such an example, subsequent to a recharge process, the energy source of the mobile device may be "fully charged" (e.g., above 85%, 90%, and the like). In another example, during a previous recharge process, the renewable energy device associated with the mobile device may not recharge the energy source of the mobile device. In such an example, subsequent to the recharge process, the energy source of the mobile device may not be "fully charged" (e.g., below 80%, 75%, and the like).

If at block 415, the state of charge associated with the mobile device is not above a threshold then process 400 moves to block 420. At block 420 the backend system transmits, to the mobile device, a harvesting location. The harvesting location may be based upon one or more renewable energy devices associated with the mobile device. For example, if the mobile device comprises a solar panel, the harvesting location may be an area with direct sunlight. In another example, if the mobile device comprises a hydroelectric-based device, the harvesting location may be a body of water, such as a river. The harvesting location may be a location in close proximity to the current location of the mobile device. In one embodiment, the harvesting location may a location that is in-route to a second device that is in need of a recharge. In one embodiment, a harvesting location may be associated with a second mobile device, such that the second mobile device may charge the mobile device. The determination of a harvesting location may be based on the state of charge of the mobile device. For example, if the state of charge of the mobile device is within a certain range (e.g., 30% to 60%) then the backend system may determine that the mobile device has enough charge to start a route to the second device and stop at a harvesting location in-route the second device. On the other hand, if the state of charge is not within a certain range (e.g., less than 30%) then the backend system may determine that the mobile device does not have enough charge to start a route to the second device and instead determines a harvesting location in close proximity to the mobile device's current position. The backend system may transmit the harvesting location as a set of GPS coordinates.

At block 425, the mobile device lands at the harvesting location for a period of time. The period time may be such that the mobile device may reach a "fully charged" state. For example, the mobile device may land and station in a windy location for enough time such that a wind turbine associated with the mobile device may "fully charge" an energy source associated with the mobile device. In one embodiment, instead of physically integrating a renewable energy device, one or more renewable energy devices may be implemented at a harvesting location. For example, if a harvesting location is a windfarm, then the mobile device may not carry an integrated wind turbine, but instead may be docked at a station that is powered by a wind turbine. In such an example, the energy source of the mobile device may be charged by a renewable energy source without the mobile device itself having to physically integrate a renewable energy device.

At block 430 the backend system receives, from the mobile device, an indication that the state of charge is above the threshold identified at block 415. In response, at block 435 the backend system transmits to the mobile device a second device location. The backend system may determine, based on received information from the second device, that the second device is below a certain threshold (e.g., 30%) needs to be recharged. The second device may be a device within the same network as the first device. For example, the second device and first device may both be part of the same NBIoT network. The second device location may be transmitted to the mobile device as GPS coordinates.

At block 440, the mobile device lands at a location associated with the second device. The mobile device may land at a designed docking area near the second device or the mobile device may simply land within proximity of the second device. The proximity may be such that a wireless or wired charging connection may be established between the mobile device and the second device.

At block 445, the mobile device initiates a charging sequence to recharge an energy source of the second device. The energy source of the first device may be an internal or external battery of the first device. The charging sequence may utilize the connection established between the mobile device and the second device. As a result of process 400, one or more devices may be charged by a mobile device based upon a renewable energy source.

Figure 5:
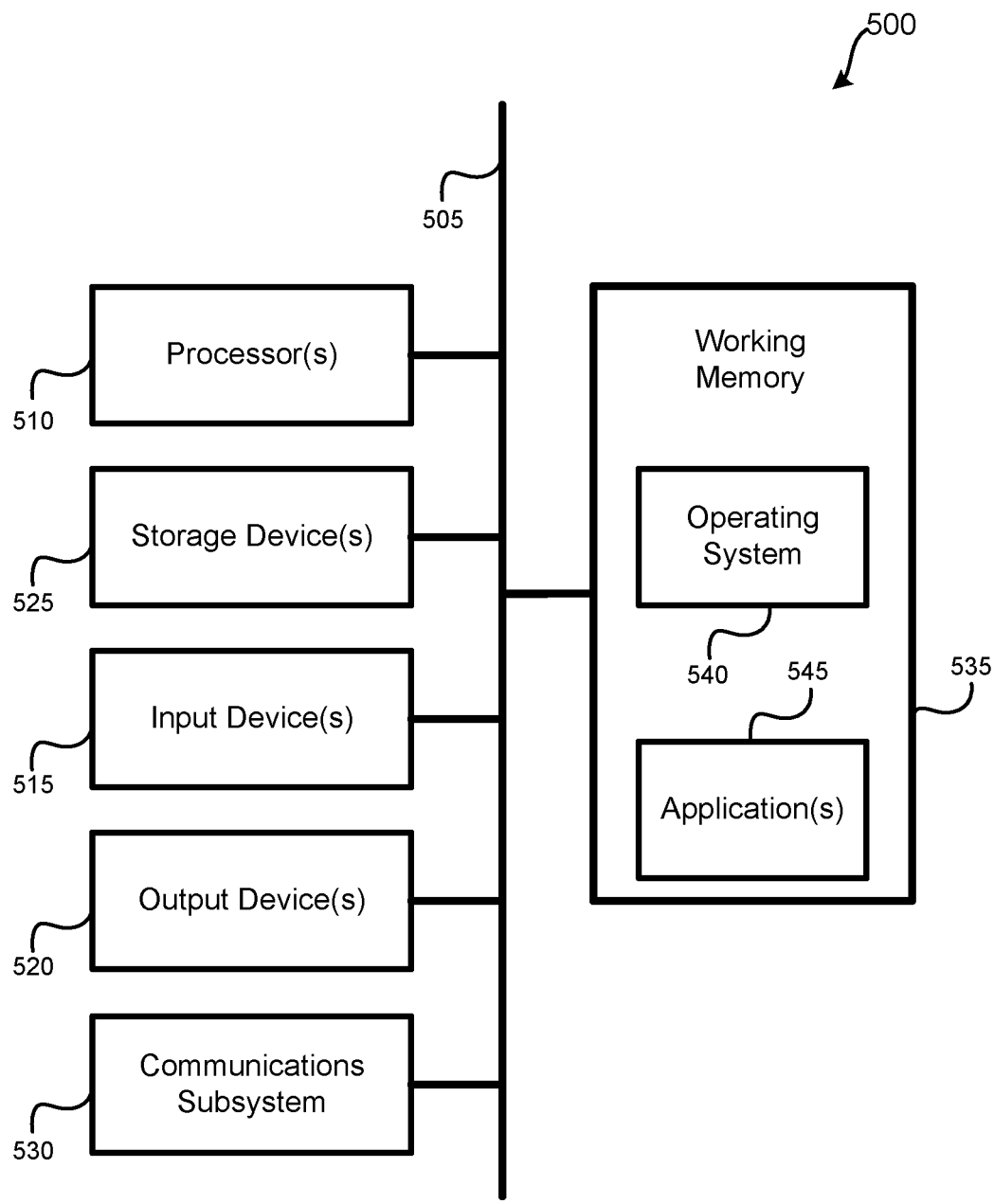
FIG. 5 illustrates an example computer system in accordance with one or more embodiments described herein.

FIG. 5 illustrates an embodiment of a computer system that may be incorporated as part of the UAV and/or the backend system. A computer system as illustrated in FIG. 5 may be incorporated as part of the previously described computerized devices, such as mobile device 102, and/or backend system 104. FIG. 5 provides a schematic illustration of one embodiment of a computer system 500 that can perform various steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication). The hardware elements may include one or more processors 510, including without limitation one or more general-purpose processors and/or one or more special-purpose processors (such as digital signal processing chips, graphics acceleration processors, video decoders, and/or the like); one or more input devices 515, which can include without limitation a mouse, a touchscreen, keyboard, remote control, and/or the like; and one or more output devices 520, which can include without limitation a display device, a printer, etc.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed. As such, computer system 500 may be interpreted as a distributed computing system that performs processing in multiple locations. In some instances, computer system 500 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for recharging an energy source, comprising:
   in response to a first device having a state of charge below a first threshold, receiving, at a mobile device, from a backend computer system, location information for the first device;
   positioning, by the mobile device, a certain proximity from the first device;
   establishing, by the mobile device, a connection between the mobile device and the first device; and
   initiating, via a first connection, a charging sequence to recharge the energy source associated with the first device.

2. The method for recharging the energy source of claim 1, wherein the mobile device is an unmanned aerial vehicle (UAV).

3. The method for recharging the energy source of claim 1, wherein the connection between the mobile device and the first device is a wired or wireless charging connection.

4. The method for recharging the energy source of claim 1, further comprising, during the charging sequence:
   receiving, by a renewable energy device of the mobile device, one or more renewable energy sources;
   converting, by the renewable energy device of the mobile device, the one or more renewable energy sources into energy; and
   recharging, via the energy, the energy source associated with the first device.

5. The method for recharging the energy source of claim 1, further comprising, during the charging sequence:
   discharging a battery of the mobile device to recharge the energy source associated with the first device.

6. The method for recharging the energy source of claim 1, further comprising:
   subsequent to the charging sequence, receiving, by the mobile device, a harvesting location associated with a renewable energy device of the mobile device;
   positioning, by the mobile device, at a location within the harvesting location; and
   recharging, via the renewable energy device of the mobile device, an energy source associated with the mobile device at the location within the harvesting location.

7. The method for recharging the energy source of claim 6, further comprising:
   subsequent to recharging the energy source associated with the mobile device, receiving, from the backend computer system, a second location associated with a second device, wherein the first device and the second device are part of a same network.

8. A system for recharging an energy source, comprising:
   a first device that has the energy source that is rechargeable;
   a backend computer system that determines when the first device has a state of charge that is below a defined threshold; and
   a mobile device capable of travelling to the first device, wherein the mobile device is configured to:
      receive, from the backend computer system, location information for the first device;
      position a certain proximity from the first device;
      establish a connection between the mobile device and the first device; and
      initiate a charging sequence to recharge the energy source associated with the first device.

9. The system for recharging the energy source of claim 8, wherein the mobile device is an unmanned aerial vehicle (UAV) comprising an aerial propulsion system.

10. The system for recharging the energy source of claim 9, wherein the UAV comprises a wired connection that is established with the first device.

11. The system for recharging the energy source of claim 9, wherein the UAV comprises a wireless charging connection that is used to charge the energy source.

12. The system for recharging the energy source of claim 9, wherein the UAV comprises a renewable energy device, that, during the charging sequence, is configured to:
   receive a renewable energy source;
   convert the renewable energy source into energy; and
   recharge, using the energy, the energy source associated with the first device.

13. The system for recharging the energy source of claim 9, wherein the UAV comprises a battery and the UAV is configured to discharge the battery to recharge the energy source associated with the first device.

14. The system for recharging the energy source of claim 9, wherein the UAV is further configured to:
subsequent to the charging sequence, receive, from the backend computer system, an indication of a harvesting location associated with a renewable energy device of the UAV;
position at a location within the harvesting location; and
recharge, via the renewable energy device of the UAV, an energy source of the UAV at the location within the harvesting location.

15. The system for recharging the energy source of claim 14, wherein the UAV is further configured to:
subsequent to recharging the energy source, receive, from the backend computer system, a second location associated with a second device, wherein the first device and the second device are part of a same network.

16. A non-transitory processor-readable medium for using an unmanned aerial vehicle (UAV) to recharge an energy source, comprising processor-readable instructions configured to cause one or more processors to:
receive, from a backend computer system, location information for a first device that requires energy;
cause the UAV to position a certain proximity from the first device;
establish a connection between the UAV and the first device; and
initiate a charging sequence to recharge the energy source associated with the first device.

17. The non-transitory processor-readable medium for the UAV of claim 16, wherein the processor-readable instructions are further configured to cause the one or more processors to during the charging sequence:
cause the UAV to receive a renewable energy source;
control conversion of the renewable energy source into energy; and
cause recharging, using the energy, of the energy source associated with the first device.

18. The non-transitory processor-readable medium for the UAV of claim 16, wherein the processor-readable instructions are further configured to cause the one or more processors to, subsequent to the charging sequence:
receive, from the backend computer system, an indication of a harvesting location associated with a renewable energy device of the UAV;
cause the UAV to position at a location within the harvesting location; and
cause the UAV to recharge, via the renewable energy device of the UAV, an energy source of the UAV at the location within the harvesting location.

19. The non-transitory processor-readable medium for the UAV of claim 18, wherein the processor-readable instructions are further configured to cause the one or more processors to, subsequent to recharging the energy source at the location within the harvesting location:
receive, from the backend computer system, a second location associated with a second device, wherein the first device and the second device are part of a same network.

20. The non-transitory processor-readable medium for the UAV of claim 18, the processor-readable instructions are further configured to cause the one or more processors to activate a wireless charging connection that is used to charge the energy source of the first device.

* * * * *